United States Patent [19]

Kurtak et al.

[11] 3,764,649
[45] Oct. 9, 1973

[54] PREPARATION OF AMMONIUM POLYTHIOMOLYBDATE

[75] Inventors: Charles R. Kurtak, Bishop, Calif.; Laurence D. Hartzog, Kearney, Ariz.

[73] Assignee: Union Carbide Corporation, New York, N.Y.

[22] Filed: Dec. 7, 1970

[21] Appl. No.: 95,990

[52] U.S. Cl. ............... 423/56, 423/55, 75/103, 75/108, 423/517
[51] Int. Cl. .... C01g 39/00, C22b 49/00, C22b 3/00
[58] Field of Search .................... 23/359, 15 W; 423/55, 56

[56] References Cited
UNITED STATES PATENTS 2,556,255  6/1951  Carosella ......................... 23/15 W
2,892,741  6/1959  Spengler et al. ............. 23/15 W UX
3,173,754  3/1965  Kurtak ........................... 23/15 W X

OTHER PUBLICATIONS

Gmelin, "Handbuch Der Anorganischen Chemie," 8th Edition, 1935, System No. 53, Pages 267–269.

*Primary Examiner*—M. Weissman
*Attorney*—Paul A. Rose, Harrie M. Humphreys and Frederick J. McCarthy, Jr.

[57] ABSTRACT

A novel composition of matter, ammonium polythiomolybdate, having the empirical formula $3MoS_4 \cdot 2NH_4OH$.

1 Claim, No Drawings

PREPARATION OF AMMONIUM POLYTHIOMOLYBDATE

This invention relates to the preparation of a molybdenum compound having the empirical formula $3MoS_4 \cdot 2NH_4OH$ and designated as ammonium polythiomolybdate.

It is an object of the present invention to provide a novel compound of molybdenum.

It is a further object of the present invention to provide a method for preparing ammonium polythiomolybdate.

Other objects of the present invention will be apparent from the following description and claims.

The novel compound, ammonium polythiomolybdate, $3MoS_4 \cdot 2NH_4OH$, can be prepared by a process which comprises reacting in an ammoniacal aqueous environment, ammonium molybdate, ammonium sulfide, and elemental sulfur. The reaction is conducted under pressure at elevated temperatures.

A novel process for producing ammonium polythiomolybdate, $3MoS_4 \cdot 2NH_4OH$, comprises heating under pressure an aqueous ammoniacal solution of ammonium molybdate and ammonium polysulfide (elemental sulfur dissolved in ammonium sulfide) to cause reaction therebetween and the production of a dark red crystalline precipitate. Suitable reaction temperatures are in the range of about 175° to 220°C and suitable pressures are from about 300 psig to 700 psig.

The above process corresponds to the following equation:

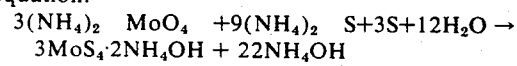

$$3(NH_4)_2 MoO_4 + 9(NH_4)_2 S + 3S + 12H_2O \rightarrow 3MoS_4 \cdot 2NH_4OH + 22NH_4OH$$

The aforedescribed process can be practiced by providing an ammoniacal ammonium molybdate solution by dissolving molybdic oxide, molybdic acid or other ammonium molybdate salts, e.g., ammonium paramolybdate and tetramolybdate in sufficient ammonium hydroxide, either at ambient or elevated temperatures and pressures to obtain a solution with a pH of at least about 9.0.

To the aforedescribed solution is added ammonium polysulfide, i.e. ammonium sulfide in which elemental sulfur is dissolved, and this reaction mixture is heated in an autoclave to a temperature in the range of 175° to 220°C and maintained in this temperature range, under pressures of from 350 psig to 700 psig for from about 1 to 2 hours, whereby a precipitate of dark, blood-red crystalline material is obtained. This material, ammonium polythiomolybdate $3MoS_4 \cdot 2NH_4OH$, is insoluble in cold water or aqueous ammonia and acetone, but is soluble in hot water or aqueous ammonia (80°C) and produces therein an orange colored solution.

Upon heating in air at 500°C, ammonium polythiomolybdate is oxidized to $MoO_3$. With heating in an atmosphere of hydrogen at 390°C, ammonium polythiomolybdate is converted to poorly crystalline $MoS_2$; at 1,080°C, $Mo_2S_3$ is formed. No other intermediate compounds are formed through this temperature range.

Characteristic properties of the novel compound are set forth in the following table:

TABLE

| | |
|---|---|
| Empirical Formula | $3MoS_4 \cdot 2NH_4OH$ |
| Infrared absorption maxima | 539, 505 337, 278 ($CM^{-1}$) |
| Specific gravity | 2.57 |
| Crystalline Structure | monoclinic |
| Indices of refraction | $n\gamma= 2.3$; $n\alpha= 2.2$ (negative sign of elongation) |
| Magnetic moment | diamagnetic |

The following example will further illustrate the present invention.

EXAMPLE I

Fifty grams of molybdenum (as molybdic oxide) were dissolved in 500 ml of 3 Molar $NH_4OH$. The molybdic oxide employed was contaminated with tungsten and the ratio of Mo to $WO_3$ in the resulting solution was approximately 3:1. Added to this solution were 425 ml of 42 percent ammonium sulfide solution in which had been dissolved 46 grams of flowers of sulfur.

The foregoing reaction mixture was digested in an autoclave at 198°C for 2 hours. The pressure developed in the autoclave was 350 psig. A dark, blood-red crystalline precipitate was obtained which was analyzed and found to be ammonium polythiomolybdate, $3MoS_4 \cdot 2NH_4OH$. The yield of molybdenum was 96.5 percent based on the amount of molybdenum employed. The precipitated material was in the form of six-sided prisms (pseudohexagonal) with jagged bases averaging 100 microns in length with average diameters of 15 microns.

When this material was roasted in air and converted to $MoO_3$ the oxide product was found to have a Mo to $WO_3$ ratio of 8,300:1.

Thus, the production of ammonium polythiomolybdate in accordance with the present invention, provides a highly selective precipitation of molybdenum from a tungsten contaminated solution.

A further example is provided to illustrate a novel method of producing $MoS_2$ from ammonium polythiomolybdate.

EXAMPLE II

Ten grams of ammonium polythiomolybdate were heated in a tube furnace at 600°C under a hydrogen atmosphere for 2 hours.

The resulting product, when analyzed, shows the stoichiometry of $MoS_2$.

Surface area measurement showed 20 square meters per gram.

As shown by Example II, the novel material of the present invention can be used in the production of $MoS_2$ which material is useful as a lubricant and catalyst.

What is claimed is:

1. A method for recovering molybdenum from tungsten-contaminated molybdenum oxide which comprises dissolving the tungsten-contaminated molybdenum oxide in an aqueous ammoniacal media together with ammonium sulfide and elemental sulfur to provide a solution having a pH of at least about 9 and subjecting said solution to an elevated temperature in the range of about 175° to 220°C and pressure conditions of about 300 psig to 700 psig for a time sufficient to thereby precipitate the molybdenum values in the form of a dark red crystalline material which is essentially free of tungsten and which has the following properties

TABLE

| | |
|---|---|
| Empirical Formula | $3MoS_4 \cdot 2NH_4OH$ |
| Infrared absorption maxima | 539,505 337, 278 ($CM^{-1}$) |
| Specific gravity | 2.57 |
| Crystalline Structure | monoclinic |
| Indices of refraction | $n\gamma= 2.3$; $n\alpha= 2.2$ (negative sign of elongation) |
| Magnetic moment | diamagnetic |

* * * * *